United States Patent
Arnold et al.

(10) Patent No.: US 8,978,799 B2
(45) Date of Patent: Mar. 17, 2015

(54) DRIVE TRAIN HAVING A WET STARTING CLUTCH FOR HYBRID APPLICATIONS

(75) Inventors: Johannes Arnold, Achern (DE); Oliver Noehl, Buehlertal (DE); Ivo Agner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 814 days.

(21) Appl. No.: 12/510,767

(22) Filed: Jul. 28, 2009

(65) Prior Publication Data

US 2009/0283344 A1 Nov. 19, 2009

Related U.S. Application Data

(63) Continuation of application No. PCT/DE2008/000142, filed on Jan. 25, 2008.

(30) Foreign Application Priority Data

Jan. 29, 2007 (DE) .......................... 10 2007 005 181

(51) Int. Cl.
| | |
|---|---|
| *B60K 6/42* | (2007.10) |
| *F16D 25/12* | (2006.01) |
| *B60K 6/26* | (2007.10) |
| *B60K 6/387* | (2007.10) |
| *B60K 6/40* | (2007.10) |
| *B60K 6/48* | (2007.10) |
| *F02N 11/04* | (2006.01) |
| *F02N 15/00* | (2006.01) |
| *F02N 15/02* | (2006.01) |
| *F02N 15/06* | (2006.01) |
| *F16D 25/0638* | (2006.01) |

(52) U.S. Cl.
CPC .............. *F16D 25/123* (2013.01); *B60K 6/26* (2013.01); *B60K 6/387* (2013.01); *B60K 6/40* (2013.01); *B60K 6/48* (2013.01); *F02N 11/04* (2013.01); *F02N 15/006* (2013.01); *F02N 15/022* (2013.01); *F02N 15/063* (2013.01); *F16D 25/0638* (2013.01); *Y02T 10/6221* (2013.01)
USPC ............................... 180/65.22; 477/3; 310/78

(58) Field of Classification Search
CPC ............ B60K 6/40; B60K 6/405; B60K 6/26; B60K 6/38; B60K 6/383; B60K 6/387; H02K 7/006
USPC ............ 180/165, 65.21, 65.22; 310/75 R, 76, 310/77, 78, 92, 100; 477/3; 475/5
See application file for complete search history.

(56) References Cited

U.S. PATENT DOCUMENTS 5,482,512 A * 1/1996 Stevenson ..................... 475/5
5,927,452 A * 7/1999 Freise et al. ................ 192/3.52
(Continued)

FOREIGN PATENT DOCUMENTS

DE 100 18 926 A 11/2000
DE 10146837 A1 5/2002
(Continued)

*Primary Examiner* — J. Allen Shriver, II
*Assistant Examiner* — Emma K Frick
(74) *Attorney, Agent, or Firm* — Lucas & Mercanti, LLP (57) ABSTRACT

A starting clutch running in oil is present in the drive train of a motor vehicle which has an internal combustion engine and a starter generator. The rotor of the starter generator is supported on a clutch cover, at least indirectly, and the clutch cover is rotationally fixed to the clutch bell of the transmission.

17 Claims, 6 Drawing Sheets

(56) References Cited

U.S. PATENT DOCUMENTS

| | | | |
|---|---|---|---|
| 6,258,001 B1* | 7/2001 | Wakuta et al. | 475/5 |
| 6,354,974 B1* | 3/2002 | Kozarekar | 475/5 |
| 6,474,428 B1* | 11/2002 | Fujikawa et al. | 180/65.25 |
| 6,478,101 B1* | 11/2002 | Taniguchi et al. | 180/65.22 |
| 6,585,066 B1* | 7/2003 | Koneda et al. | 180/65.25 |
| 6,628,021 B2* | 9/2003 | Shinohara et al. | 310/68 B |
| 6,736,228 B2* | 5/2004 | Donohue et al. | 180/65.25 |
| 6,777,837 B2* | 8/2004 | Tsuzuki et al. | 310/67 R |
| 6,863,140 B2* | 3/2005 | Noreikat et al. | 180/65.23 |
| 6,888,273 B2* | 5/2005 | Hughes et al. | 310/78 |
| 6,935,450 B1* | 8/2005 | Tsuzuki et al. | 180/65.26 |
| 7,264,101 B2 | 9/2007 | Hauck | |
| 7,318,512 B2 | 1/2008 | Bauer | |
| 7,489,114 B2* | 2/2009 | Nomura et al. | 322/33 |
| 7,509,802 B2* | 3/2009 | Hammond et al. | 60/330 |
| 7,578,363 B2* | 8/2009 | Kim | 180/65.25 |
| 7,679,238 B2* | 3/2010 | Nomura et al. | 310/78 |
| 7,954,578 B2* | 6/2011 | Kim et al. | 180/65.22 |
| 8,602,192 B2 | 12/2013 | Grosspietsch | |
| 2010/0038201 A1* | 2/2010 | Mueller et al. | 192/3.29 |
| 2010/0062899 A1* | 3/2010 | Engelmann et al. | 477/86 |
| 2010/0081540 A1* | 4/2010 | Krause et al. | 477/3 |
| 2011/0221292 A1* | 9/2011 | Kuwahara et al. | 310/78 |

FOREIGN PATENT DOCUMENTS

| | | |
|---|---|---|
| DE | 10115504 | * 10/2002 |
| DE | 10115504 A1 | 10/2002 |
| DE | 10 2005 030 192 A1 | 2/2006 |
| EP | 1584830 A1 | 10/2005 |
| EP | 1 710 113 | 10/2006 |
| FR | 2 862 025 A | 5/2005 |
| JP | 11107798 A | 4/1999 |
| JP | 2002059752 A | 2/2002 |
| JP | 2003220842 A | 8/2003 |
| JP | 2006298272 A | 11/2006 |
| JP | 2006316926 A | 11/2006 |
| WO | 2006054661 A1 | 5/2006 |

* cited by examiner

Figure 2:
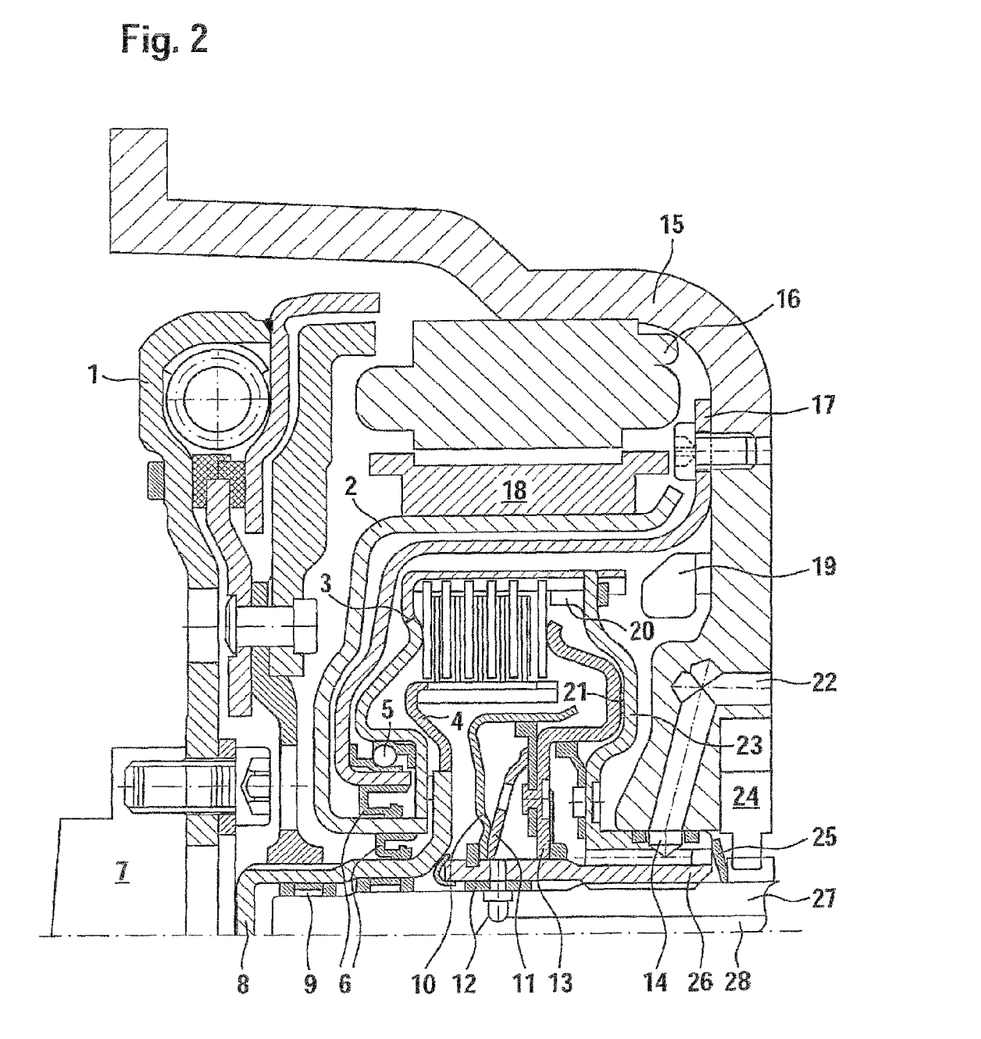
FIG. 2 shows a first exemplary embodiment with a dry-running starter generator.

Fig. 6 ived by the internal combustion engine A via a spline. A torsional vibration damper 1 configured as a dual-mass flywheel is located between internal combustion engine A and drive hub 8. The outer disc carrier 3 is the output drive. The wet clutch B is configured in such a manner that the vehicle can start without the aid of the electric motor.

DRIVE TRAIN HAVING A WET STARTING CLUTCH FOR HYBRID APPLICATIONS

This application is a continuation of PCT/DE2008/000142 filed Jan. 25, 2008, which in turn claims the priority of DE 10 2007 005 181.8, filed Jan. 29, 2007, the priority of these two applications is hereby claimed and these two applications are incorporated by reference herein.

The invention relates to a drive train for a motor vehicle having an internal combustion engine and a starter generator, the rotational connection in the power flow between the internal combustion engine on the one hand and the starter generator and the transmission on the other being able to be established by means of a starting clutch running in oil.

Known from the prior art (FR 2862025) is, for example, a solution in which a starter generator (or E-machine or motor-generator; see definition below) is arranged in the drive train of a motor vehicle by means of a wet-running clutch and a further clutch—here in the form of a dog clutch.

It is the object of the invention further to improve a clutch system of this type. In this context, "to improve" means that the drive train is configured in a more cost-effective and space-saving manner.

This object has been achieved in that a wet starting clutch can be used in a hybridized drive train. The internal combustion engine drives the transmission input shaft via a starting clutch. Located on the transmission input shaft is an electric motor or starter generator which can be used for boosting and energy recovery. The starting and restarting function of the internal combustion engine is effected via the electric motor and closing of the clutch. The transmission is an automated transmission or an automatic transmission without torque converter.

Within the context of the present invention, a starter generator is to be understood as a motor generator, with the motor not necessarily functioning as a starter. In other words, a motor vehicle according to the present invention may also have an additional starter. The term starter generator has been chosen here because it has been used in this sense among experts for years. The term E-machine is also in widespread use.

Variants described below represent the ways in which the starting clutch and the damper system may be integrated in the drive train.

The invention is now be explained in more detail with reference to the figures, in which.

Figure 1:
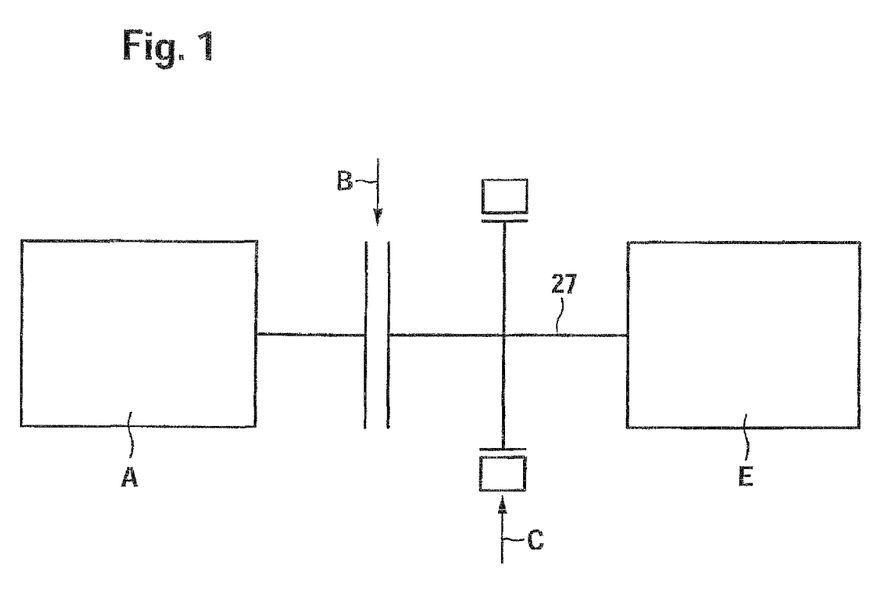
FIG. 1 shows a schematic arrangement of the drive train according to the invention.

FIG. 1 shows a schematic structure of the drive train according to the invention. The internal combustion engine A is connectable to the starter generator C via the starting clutch B. The starter generator C is connected to the transmission via the transmission input shaft 27. The transmission is an automatic transmission, but in this drive train according to the invention it does not have a torque converter. When starting the internal combustion engine A by means of the starter generator C, a drive position must not be selected in the automatic transmission. Through this configuration only one clutch, specifically only the so-called starting clutch C, is sufficient when operating with a starter generator C.

In the variant represented in FIG. 2 the drive hub 8—and therefore the inner disc-carrier 4—is driven by the internal combustion engine A via a spline. A torsional vibration damper 1 configured as a dual-mass flywheel is located between internal combustion engine A and drive hub 8. The outer disc carrier 3 is the output drive. The wet clutch B is configured in such a manner that the vehicle can start without the aid of the electric motor.

The rotor 18 of the starter generator C (=electric motor) is connected to the outer disc carrier 3 via a rotor carrier 2. A sealing element 6 (e.g. radial shaft sealing ring) is located between rotor carrier 2 and clutch cover 17. The sealing element 6 prevents clutch cooling oil, which has emerged from the outer disc carrier 3, from reaching the dry space. Located in the dry space are the torsional vibration damper 1, as well as stator 16 and rotor 18 of the electric motor. A further sealing element 6 is located between the inner disc carrier 4 and the rotor carrier 2. This prevents leakage oil located between inner and outer disc carriers from reaching the dry space. Here the sealing element 6 provides the sealing function between two parts rotating at different speeds.

The clutch cover 17 is connected in a rotationally fixed and oil-tight manner to the clutch bell 15.

The inner disc carrier 4 or the drive hub 8 are mounted on the transmission input shaft 27 via needle or sliding bearings 9.

The clutch basket, which is composed of the outer disc carrier 3 and the sheet-metal hub element 23, is mounted on the left side on the clutch cover 17 via a rolling bearing 5. This bearing 5 can absorb both radial and axial forces. Alternatively, two separate bearings (for example an axial bearing and a radial bearing, not shown in FIG. 2) may be used here. The sheet-metal hub element 23 is welded to the driven hub 26, which is mounted on the transmission input shaft 27. As a result of the support of the clutch basket on the transmission input shaft 27, an additional rolling or sliding bearing can be dispensed with.

In order for the outer disc carrier 3 and the sheet-metal hub element 23 to form a stiff structure, as is needed for the mounting, stiffening plates 20, which are braced against the outer disc carrier 3, extend from the sheet-metal hub element 23. Optionally, the sheet-metal hub element 23 may be welded to the outer disc carrier 3.

The above-mentioned rolling bearing 5 between the clutch cover 17 and the outer disc carrier 3 must be pretensioned. For this purpose, a pretensioning spring 25 bears against a pinion 31 (see FIG. 3) pressed onto the transmission input shaft 27 and pretensions the clutch basket and the rolling bearing 5 via the driven hub 26.

The pinion 31 pressed onto the transmission input shaft 27 provides the mounting and drive of the oil pump 24.

The actuating oil for the clutch B is supplied via a passage 22 integrated in the clutch bell 15 or pump cover. The oil is introduced into the rotating clutch unit via a rotary port 14 in the driven hub 26. Inside the driven hub 26 the oil flows through bores to the actuating piston 13.

The components involved in the actuation of the clutch B rotate at the transmission input speed, for which reason a transmission-side actuation of the clutch is referred to here. The actuation force is additionally absorbed inside the clutch basket.

The rotary port additionally assumes the function of sealing with respect to the oil pump 24, for which reason the radial shaft sealing ring usual at this location in automatic transmissions is dispensed with.

The cooling oil is supplied to the clutch B via the transmission input shaft 27. The oil reaches the centrifugal force compensation unit via transverse bores in the transmission input shaft 27 and a bridging ring 12 between driven hub 26 and transmission input shaft 27, and via transverse bores in the driven hub 26. This centrifugal force compensation unit is delimited on the left by the angled component and on the right by the piston 13. The oil through openings in the return spring 11 into the actual centrifugal force chamber 10. The angled component has openings on its radially inner end or its radially inner left-hand wall. Only when the centrifugal force chamber 10 is substantially filled with oil does the oil contained therein leave the centrifugal force chamber 10 via the openings (not shown here). Because an oil-filled chamber is also present on the right-hand side of the piston 13, the oil generates an oil pressure on each side of the piston 13 through the centrifugal effect of the rotating oil masses. Because the pressurized areas are of substantially equal size, the piston 13 is maintained substantially in an equilibrium of forces by means of the centrifugal chamber 10.

An opening in the sheet metal element of the centrifugal force chamber 10 determines the filling level of the oil in the centrifugal force chamber 10. Inflowing cooling oil drains via the opening in the sheet metal element of the centrifugal force chamber 10 and then flows in a radial direction to the inner disc carrier 4 in order to cool the clutch.

After the cooling oil has left the outer disc carrier 3, the oil rotating in the clutch cover 17 is conveyed by a stripping unit 19 through the dividing wall between clutch B and transmission E into the oil sump.

Installation of the clutch unit takes place as follows: During assembly of the clutch B the sealing element 6 which is located between rotor carrier 2 and clutch cover 17, and the rolling bearing 5 which is located between clutch cover 17 and outer disc carrier 3, are optionally welded in. This unit can no longer be dismantled. The completely assembled clutch, including clutch cover 17, rotor carrier 2 and rotor 18, is fitted onto the transmission input shaft 27. The clutch cover 17 is then screwed to the rear wall of the clutch bell 15. The stator 16 of the starter generator C is then installed. The torsional vibration damper 1 is screwed to the crankshaft 7. Finally, the clutch B is connected to the torsional vibration damper 1 via the spline on the drive hub 8 and internal combustion engine A and clutch bell 15 are bolted together.

Figure 3:
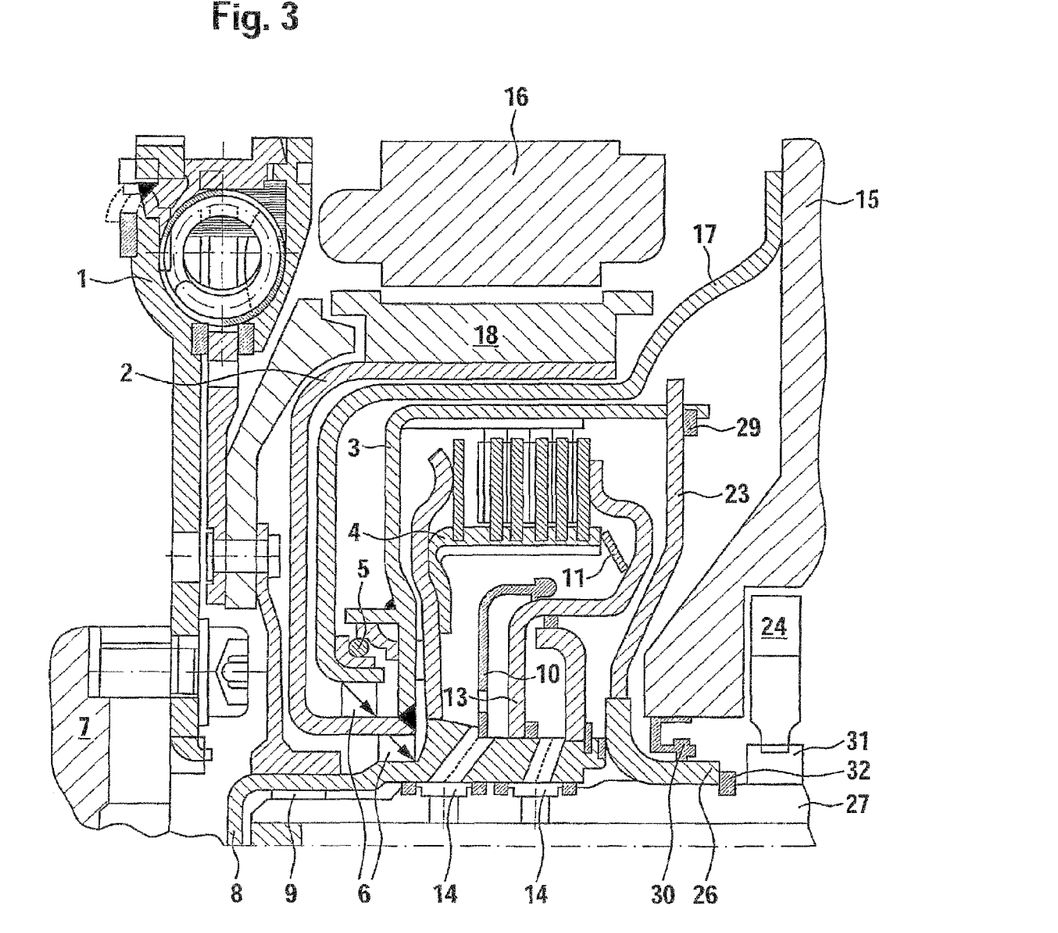
FIG. 3 shows a second exemplary embodiment with a dry-running starter generator.

In the variant represented in FIG. 3, the drive hub 8, and therefore the inner disc carrier 4, are driven via a spline by the internal combustion engine A. A dual-mass flywheel 1 is located between drive hub 8 and internal combustion engine A. The drive hub 8 is welded or riveted to the inner disc carrier 4. The outer disc carrier 3 is the output drive. The wet clutch B is configured in such a manner that the vehicle can start without the aid of the electric motor.

The rotor 18 of the electric motor C is connected to the outer disc carrier 3 via a rotor carrier 2. A sealing element 6 (e.g. radial shaft sealing ring) is located between the rotor carrier 2 and the clutch cover 17. The sealing element 6 prevents clutch cooling oil, which has emerged from the outer disc carrier 3, from reaching the dry space. Located in the dry space are the torsional vibration damper 1 and the stator 16 and the rotor 18 of the electric motor C. A further sealing element 6 (e.g. radial shaft sealing ring) is located between the drive hub 8 and the rotor carrier 2. This prevents leakage oil contained between the inner 4 and outer disc carrier 3 from reaching the dry space. Here the sealing element 6 provides the sealing function between two parts rotating at different speeds.

The drive hub 8 is mounted on the transmission input shaft 27 via rolling or sliding bearings.

The driven hub 26 is connected to the transmission input shaft 27 via a spline. The sheet-metal hub element 23 is welded to the driven hub 26 and is connected positively to the outer disc carrier 3. Outer disc carrier 3 and sheet-metal hub element 23 are secured against unintended detachment by a securing element 29.

The clutch basket, consisting of outer disc carrier 3, sheet-metal hub element 23 and driven hub 26, is mounted on the transmission input shaft 27 via the rolling bearing 5 between clutch cover 17 and rotor carrier 2 and the seating.

The rolling bearing 5, which supports the outer disc carrier 3 on the clutch cover 17, is pretensioned by means of a pretensioning spring 25 which is located between the driven hub 26 and the securing element 32 (not shown in FIG. 3) located behind the driven hub 26.

The pump pinion 31 is pressed onto the transmission input shaft 27 and serves as mounting and drive for the oil pump 24.

The actuating oil and cooling oil are supplied to the clutch B via two bores (not shown in FIG. 3) integrated in the transmission input shaft 27. Cooling and actuating oil flows via radially disposed bores to the rotary ports 14, where it is transferred to the drive hub 8 rotating at engine speed. In the drive hub 8 the actuating oil is supplied via radially disposed bores to the actuating cylinder. The cooling oil also flows through radially disposed bores to the centrifugal force compensation unit and the clutch cooling system. Surplus oil flowing to the centrifugal force compensation unit flows through bores in the sheet-metal element of the centrifugal force unit, which bores determine the filling level, to the clutch cooling system.

The return spring 11, between the piston 13 and the inner disc carrier 4, opens the clutch B after the actuation pressure has dropped, and moves the piston 13 to its starting position.

The actuating mechanism of the clutch B rotates at engine speed, for which reason engine-side actuation of the clutch B is referred to. The actuating forces of the clutch B, which arise, are absorbed inside the drive hub 8.

Because the rotary ports 14 are not integrated in the driven hub 26 in this variant, an additional sealing element 30 is required between the clutch bell 15 or the pump housing and the driven hub, in order to prevent the pump 24 from suctioning air.

Installation of the clutch unit takes place as follows: During assembly of the clutch B, the sealing element 6, which is located between the rotor carrier 2 and the clutch cover 17, and the rolling bearing 5, which is located between the clutch cover 17 and the outer disc carrier 3, are optionally welded in. This unit can no longer be dismantled. Instead of welding, however, this connection may be only plugged in or caulked.

The completely assembled clutch B and rotor 18 of the E-machine C are fitted onto the transmission input shaft 27. The clutch cover 17 is then screwed to the rear wall 15 of the clutch bell (screw connection not shown in FIG. 3). The stator 16 of the E-machine C is then installed.

The torsional vibration damper 1 is screwed to the crankshaft 7. Finally, the clutch B is connected to the torsional vibration damper 1 via the toothing on the drive hub 8, and internal combustion engine A and clutch bell 15 are bolted together.

Figure 4:
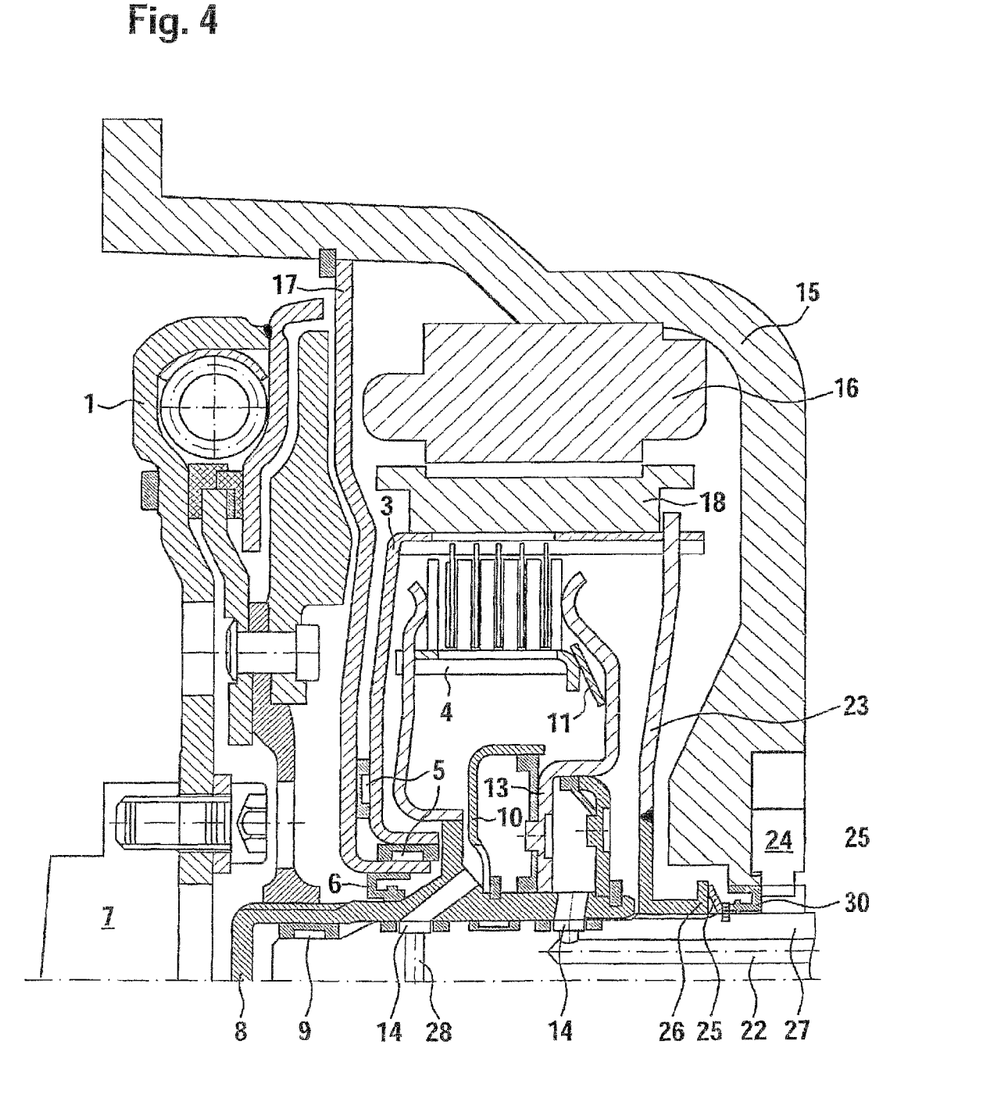
FIG. 4 shows a first exemplary embodiment with a starter generator running in oil.

Essentially, FIGS. 2 and 3 differ in that in FIG. 2 the oil supply takes place via a passage 22 in the clutch bell 15 and via a rotary port in the transmission input shaft 27, while in FIG. 3 the oil both times In the variant represented in FIG. 4 the drive hub 8, and therefore the inner disc carrier 4, are driven by the internal combustion engine A via a spline. A dual-mass flywheel 1 is located between internal combustion engine A and drive hub 8. The outer disc carrier 3 is the output drive. The wet clutch is configured in such a manner that the vehicle can start without the aid of the electric motor.

In contrast to the variants of FIGS. 2 and 3, the starter generator C is located in the wet space. Only the torsional vibration damper 1 is located in the dry space. In order to separate the wet and dry spaces a sealing element 6 is located between clutch cover 17 and drive hub 8. This solution is also distinguished by the fact that the clutch cover 17 is no longer located between a rotor carrier 2 and an outer disc carrier 3. In FIG. 4 the outer disc carrier 3 is at the same time the rotor carrier.

The clutch cover 17 separates the clutch B and the starter generator C from the torsional vibration damper 1. For this reason, the rotor 18 of the E-machine can be fastened directly to the outer disc carrier 3. The rotor contains axially disposed oil passages in order to drain the cooling oil emerging from the clutch.

The outer disc carrier 3 is supported on the clutch cover 17 via a radial and axial bearing and, together with the sheet-metal hub element 23 and the driven hub 26, forms the clutch basket. The sheet-metal hub element 23 is connected positively via a toothing to the outer disc carrier 3 for torque transmission and is welded or riveted to the driven hub 26 (riveting not shown in FIG. 4). The driven hub 26 is supported on the transmission input shaft 27 via a spline.

The inner disc carrier 4 and the drive hub 8, respectively, are mounted on the transmission input shaft 27 via two rolling bearings.

The axial bearing 5, which supports the clutch basket and the outer disc carrier 3, is pretensioned via a spring 25 which is located between a circlip and the driven hub 26.

The pump pinion 31 is pressed onto the transmission input shaft 27 and serves as mounting and drive for the oil pump 24.

The actuating oil and cooling oil are supplied to the clutch B via two bores 22, 28 integrated in the transmission input shaft 27. Cooling and actuating oil flows via radially disposed bores to the rotary ports 14, where it is transferred to the drive hub rotating at engine speed. In the drive hub 8, the actuating oil is supplied via bores to the actuating cylinder. The cooling oil also flows through bores to the centrifugal force compensation unit and to the clutch cooling system. Surplus oil flowing to the centrifugal force compensation unit flows to the clutch cooling system through bores in the sheet-metal element of the centrifugal force unit 10, which bores determine the filling level.

The actuating mechanism of the clutch rotates at engine speed, for which reason engine-side actuation of the clutch is referred to. The clutch-actuating forces arising are absorbed inside the drive hub 8.

The return spring 11, between piston 13 and inner disc carrier 4, opens the clutch B after the actuating pressure has dropped, and moves the piston 13 to its starting position.

Because the rotary ports 14 are not integrated in the driven hub 26 in this variant, an additional sealing element 30 is required between the clutch bell 15 or the pump housing and the driven hub 26, in order to prevent the pump from suctioning air.

Installation of the clutch unit takes place as follows: The completely assembled clutch, including the rotor 18, is fitted onto the transmission input shaft 27. The clutch cover 17 with axial bearing is then fitted into the clutch bell 15. The clutch cover 17 is then fixed in the clutch bell 15 by means of a securing element. This is followed by installation of the sealing element between clutch cover 17 and drive hub 8. The stator 16 of the E-machine is then installed.

The torsional vibration damper 1 is screwed to the crankshaft. Finally, the clutch B is connected to the torsional vibration damper 1 via the toothing on the drive hub 8 and internal combustion engine A and clutch bell 15 are bolted together.

Figure 5:
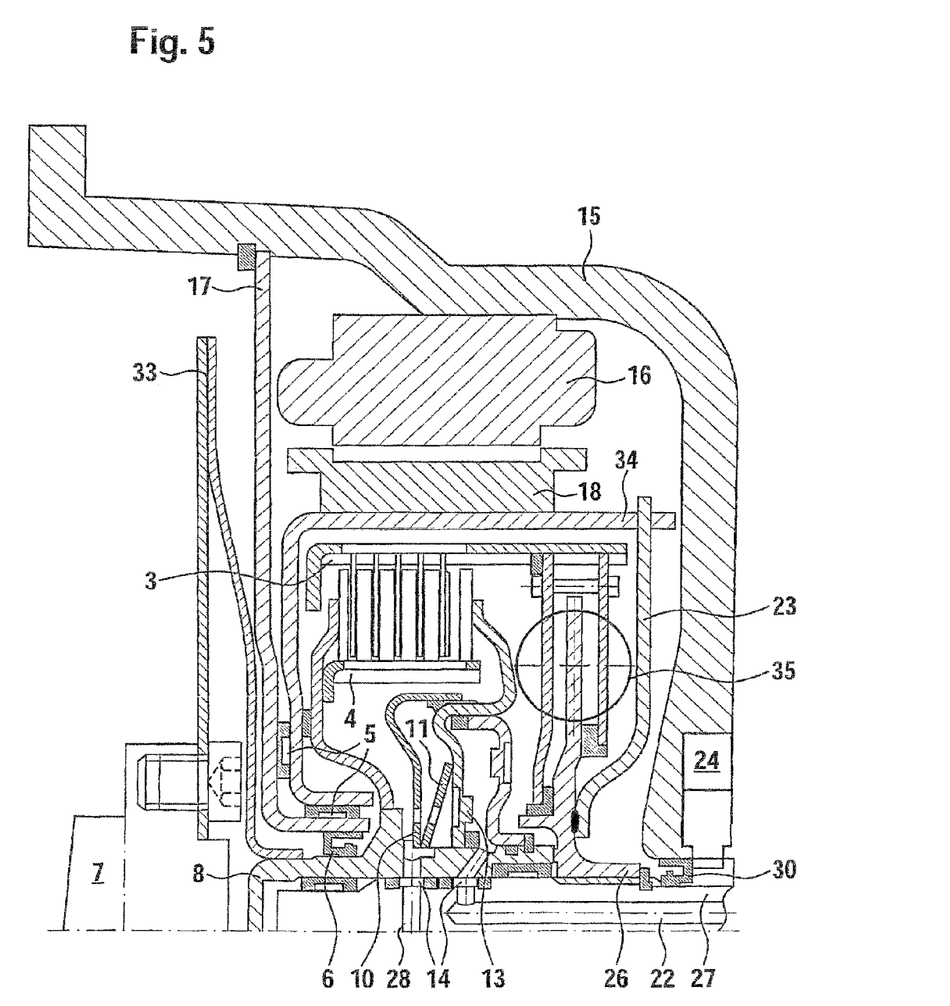
FIG. 5 shows a second exemplary embodiment with a starter generator running in oil.

In the variant represented in FIG. 5, the drive hub 8, and therefore the inner disc carrier 4, are driven by the internal combustion engine A via a spline. A flexible plate 33 is located between internal combustion engine A and drive hub. The outer disc carrier 3 is the output drive. The wet clutch is configured in such a manner that the vehicle can start without the aid of the electric motor.

The outer disc carrier 3 is connected to the driven hub 26 via a vibration damper 35.

The rotor carrier 34 of the E-machine C is supported on the engine side on the clutch cover 17 via rolling bearings. On the output side the rotor carrier 34 is connected positively to a sheet-metal hub element 23 which is welded or riveted (not shown in FIG. 5) to the driven hub 26.

As in FIG. 4, the E-machine C is located in the wet space. Only the flexible plate 33 is located in the dry space. In order to separate the wet and dry spaces, a sealing element 6 is located between clutch cover 17 and the drive hub 8.

The outer disc carrier 3 is connected to the driven hub 26 via the vibration damper 35. The driven hub 26 is supported on the transmission input shaft 27 via a spline.

The inner disc carrier 4 and the drive hub 8 are mounted on the transmission input shaft 27 via two rolling bearings.

The pump pinion 31 (not shown here) is pressed onto the transmission input shaft 27 and serves as the mounting and drive for the oil pump 24.

The actuating oil and cooling oil are supplied to the clutch via two bores integrated in the transmission input shaft. Cooling and actuating oil flows via radially disposed bores to the rotary ports, where it is transferred to the drive hub rotating at engine speed. In the drive hub the actuating oil is supplied via bores to the actuating cylinder. The cooling oil also flows through bores to the centrifugal force compensation unit and to the clutch cooling system. Surplus oil flowing to the centrifugal force compensation unit flows to the clutch cooling system through bores in the sheet-metal element of the centrifugal force unit, which bores determine the filling level.

The clutch actuating mechanism rotates at engine speed, for which reason engine-side actuation of the clutch B is referred to. The clutch actuating forces arising are absorbed inside the drive hub 8.

The return spring 11, between the piston 13 and the sheet-metal element of the centrifugal force unit, opens the clutch after the actuating pressure has dropped, and moves the piston to its starting position. The return spring includes bores through which oil coming from the rotary port flows into the centrifugal force chamber.

Because the rotary ports 14 are not integrated in the driven hub 26, an additional sealing element 30 is required between the clutch bell 15 or the pump housing and the driven hub 26, in order to prevent the pump 24 from suctioning air.

Installation of the clutch unit takes place as follows: The completely assembled clutch including rotor carrier and rotor is fitted onto the transmission input shaft. The clutch cover with axial bearing is then fitted into the clutch bell. Next, the clutch cover is fixed in the clutch bell by means of a securing element. Installation of the sealing element between the clutch cover and the drive hub then takes place. The stator of the machine is then installed.

The flexible plate 33 is screwed to the crankshaft 7. Finally, the clutch B is connected to the flexible plate 33 via the toothing on the drive hub 8, and the internal combustion engine A and the clutch bell 15 are bolted together.

Figure 6:
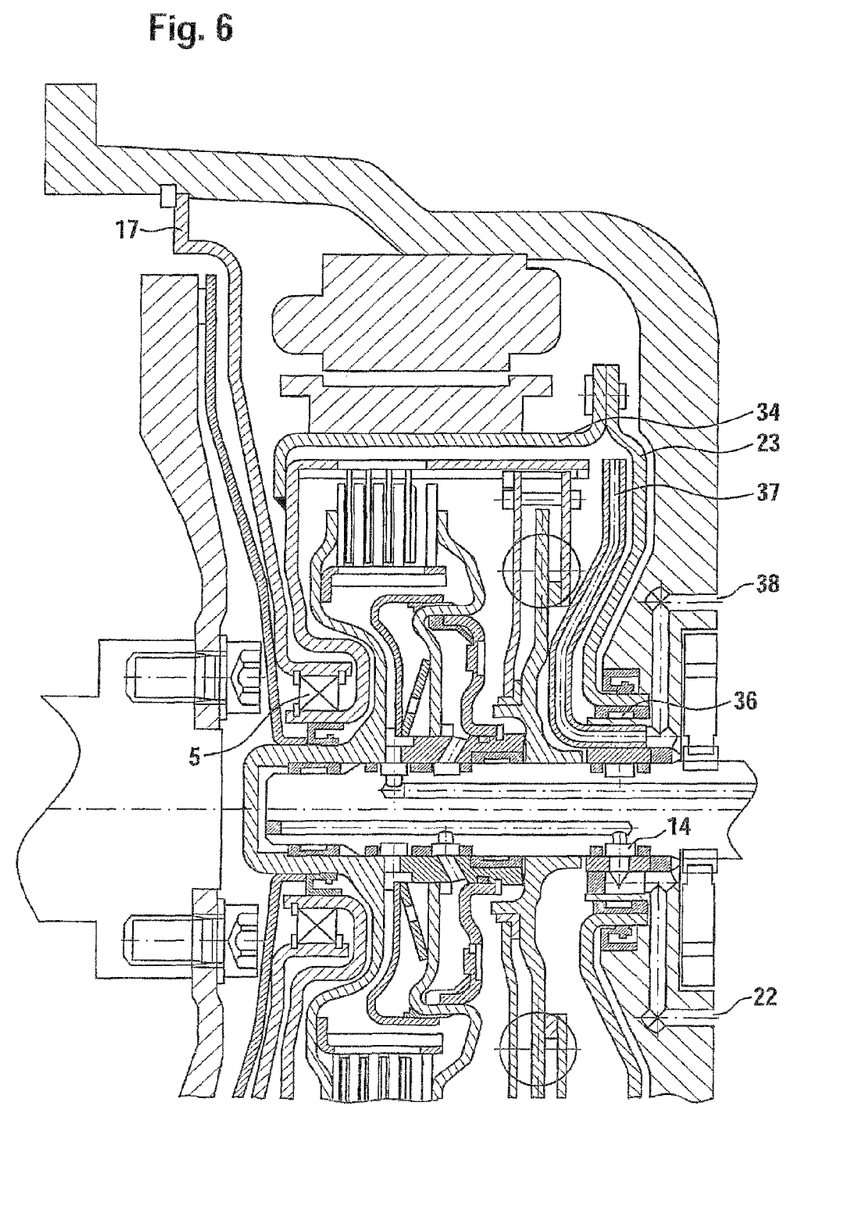
FIG. 6 shows a third exemplary embodiment with a starter generator running in oil.

In contrast to the variant represented in FIG. 5, the variant represented in FIG. 6 additionally includes a scavenging tube 37. The rotor 34 is connected to the outer disc carrier and is riveted to the sheet-metal hub element 23. Rotor carrier and sheet-metal hub element 23 form a channel in which the oil emerging from the outer disc carrier forms an oil ring rotating at circumferential velocity. The scavenging tube 37 is connected to the clutch bell 15 and utilizes the kinetic energy of the oil to generate an oil feed flow which is conveyed back to the oil sump via the extraction channel 38.

The outer disc carrier, the rotor carrier and the sheet-metal hub element form the clutch basket. The latter is supported on the transmission side on the clutch bell via a needle bearing. On the engine side the clutch basket is supported on the clutch cover via a rolling bearing.

The pressure oil is supplied to the transmission input shaft 27 through a conduit in the clutch bell 15 or the pump housing and a rotary port 14. The sealing rings of the rotary port 14 at the same time seal the pump suction chamber, thus preventing the pump from suctioning air. At the same time an additional sealing element is saved.

LIST OF REFERENCES

1 Torsional Vibration Damper; Dual-Mass Flywheel (DMF)
2 Rotor Carrier
3 Outer Disc Carrier
4 Inner Disc Carrier
5 Rolling Bearing
6 Sealing Element
7 Crankshaft
8 Drive Hub
9 Rolling Bearing
10 Centrifugal Force Region
11 Return Spring
12 Bridging Ring
13 Piston
14 Rotary Port
15 Clutch Bell
16 Stator of Starter Generator (E-machine)
17 Clutch cover
18 Rotor of Starter Generator (E-machine)
19 Stripping Unit
20 Stiffening Plate
21 Thrust Plate
22 Pressure Oil Feed
23 Sheet-metal Hub Element
24 Oil Pump
25 Pretensioning Spring
26 Driven Hub
27 Transmission Input Shaft
28 Cooling and Centrifugal Oil Feed
29 Securing Element
30 Sealing Element
31 Pump Pinion
32 Securing Element
33 Flexible Plate
34 Rotor Carrier
35 Vibration Damper
36 Needle Roller Bearing
37 Scavenging Tube
38 Extraction Channel
A Internal Combustion Engine
B Starting Clutch
C Starter Generator (E-machine)
E Automatic Transmission Without Torque Converter

The invention claimed is:

1. A drive train in a motor vehicle, comprising:
an internal combustion engine; and
a starter generator,
wherein a rotational connection in power flow between the internal combustion engine and the starter generator and between the internal combustion engine and the transmission is established by a starting clutch running in oil,
wherein the starting clutch has an outer disc carrier connected to the starter generator, an inner disc carrier connected to the internal combustion engine, and a plurality of inner clutch discs interspaced by a plurality of outer clutch discs, wherein the inner discs are mounted on the inner disc carrier so that they rotate with the inner disc carrier and are axially movable on the inner disc carrier, and the outer discs are mounted on the outer disc carrier so that they rotate with the outer disc carrier and are axially movable on the outer disc carrier, and the rotor of the starter generator is substantially fixed with respect to rotation with the outer disc carrier when the starting clutch is in an open state and when the starting clutch is in a closed state,
wherein the rotor of the starter generator is arranged in a rotationally fixed manner on a rotor carrier and the rotor carrier is mounted on a clutch cover and the clutch cover is connected in a rotationally fixed and oil-tight manner to a clutch bell of a transmission,
wherein the clutch cover is arranged between the rotor carrier and the outer disc carrier, whereby the starter generator is separated from an oil region of the starting clutch and the starter generator runs in a dry region, and
wherein a seal is arranged between the outer disc carrier and the clutch cover.

2. The drive train of claim 1, wherein a further seal is arranged between the rotor carrier and the clutch cover.

3. The drive train of claim 1, wherein a seal is arranged between a continuation of the outer disc carrier, a drive hub and the rotor carrier.

4. The drive train of claim 1, wherein the inner disc carrier is mounted on a transmission input shaft.

5. The drive train of claim 4, wherein, on a transmission side, the starting clutch is mounted on the transmission input shaft via a spline on a driven hub.

6. The drive train of claim 1, wherein a clutch basket, formed substantially by the outer disc carrier, is stiffened by stiffening plates extending from a sheet-metal hub element.

7. The drive train of claim 1, wherein a clutch basket, formed substantially by the outer disc carrier, is stiffened by welding a sheet-metal hub element to the outer disc carrier.

8. The drive train of claim 1, wherein a bearing between the rotor and the clutch cover is pretensioned by means of a pretensioning spring, the pretensioning spring bearing against a transmission input shaft.

9. The drive train of claim 1, wherein an oil pump for supplying the oil region is present, pump drive being effected by means of a pump pinion pressed onto a transmission input shaft and the transmission input shaft serving at the same time as a mounting of the pump pinion.

10. The drive train of claim 1, wherein a torsional vibration damper is arranged in the power flow from the internal combustion engine to the starting clutch.

11. The drive train of claim 10, wherein the torsional vibration damper is a dual-mass flywheel.

12. The drive train of claim 11, wherein the torsional vibration damper is arranged in a dry space of a clutch bell.

13. The drive train of claim 1, wherein a stripping unit is arranged in an oil region.

14. The drive train of claim 1, wherein a centrifugal force region is associated with a piston, and the centrifugal force region compensates centrifugal oil pressure on the other side of the piston.

15. A drive train in a motor vehicle, comprising:
an internal combustion engine; and
a starter generator,
wherein a rotational connection in power flow between the internal combustion engine and the starter generator and between the internal combustion engine and the transmission is established by a starting clutch running in oil,
wherein the starting clutch has an outer disc carrier connected to the starter generator, an inner disc carrier connected to the internal combustion engine, and a plurality of inner clutch discs interspaced by a plurality of outer clutch discs, wherein the inner discs are mounted on the inner disc carrier so that they rotate with the inner disc carrier and are axially movable on the inner disc carrier, and the outer discs are mounted on the outer disc carrier so that they rotate with the outer disc carrier and are axially movable on the outer disc carrier, and the rotor of the starter generator is substantially fixed with respect to rotation with the outer disc carrier when the starting clutch is in an open state and when the starting clutch is in a closed state,
wherein the rotor of the starter generator is arranged in a rotationally fixed manner on a rotor carrier and the rotor carrier is mounted on a clutch cover and the clutch cover is connected in a rotationally fixed and oil-tight manner to a clutch bell of a transmission,
wherein the clutch cover is arranged between the rotor carrier and the outer disc carrier, whereby the starter generator is separated from an oil region of the starting clutch and the starter generator runs in a dry region, and
wherein a rotor carrier and an outer disc carrier are one of formed in one piece, caulked to one another, and welded to one another.

16. The drive train of claim 15, wherein a seal is arranged between the outer disc carrier and the clutch cover.

17. A drive train in a motor vehicle, comprising:
an internal combustion engine; and
a starter generator,
wherein a rotational connection in power flow between the internal combustion engine and the starter generator and between the internal combustion engine and the transmission is established by a starting clutch running in oil,
wherein the starting clutch has an outer disc carrier connected to the starter generator, an inner disc carrier connected to the internal combustion engine, and a plurality of inner clutch discs interspaced by a plurality of outer clutch discs, wherein the inner discs are mounted on the inner disc carrier so that they rotate with the inner disc carrier and are axially movable on the inner disc carrier, and the outer discs are mounted on the outer disc carrier so that they rotate with the outer disc carrier and are axially movable on the outer disc carrier, and the rotor of the starter generator is substantially fixed with respect to rotation with the outer disc carrier when the starting clutch is in an open state and when the starting clutch is in a closed state,
wherein the rotor of the starter generator is arranged in a rotationally fixed manner on a rotor carrier and the rotor carrier is mounted on a clutch cover and the clutch cover is connected in a rotationally fixed and oil-tight manner to a clutch bell of a transmission,
wherein the clutch cover is arranged between the rotor carrier and the outer disc carrier, whereby the starter generator is separated from an oil region of the starting clutch and the starter generator runs in a dry region, and
wherein a bearing between the rotor and the clutch cover is pretensioned by means of a pretensioning spring, the pretensioning spring bearing against a transmission input shaft.

* * * * *